Patented Aug. 8, 1944

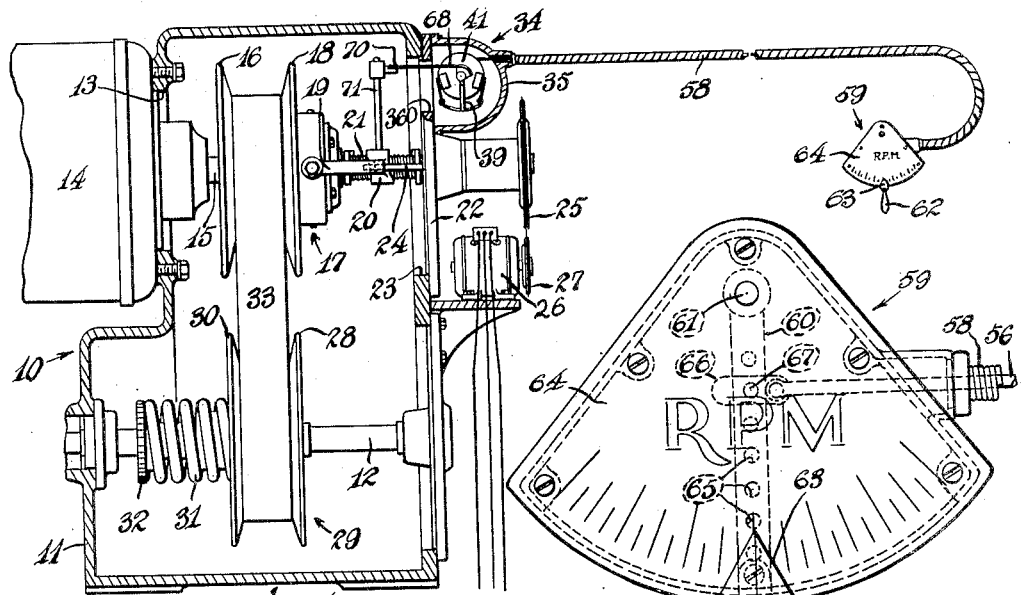

2,355,587

UNITED STATES PATENT OFFICE 2,355,587

REMOTE CONTROL MECHANISM

Paul B. Reeves, Columbus, Ind., assignor to Reeves Pulley Company, Columbus, Ind., a corporation of Indiana Application March 30, 1942, Serial No. 436,816

4 Claims. (Cl. 172—239)

The present invention relates to remote control mechanism, and is particularly concerned with a remote control mechanism for a variable speed transmission of the type including an element shiftable in opposite directions to vary oppositely the output speed of the transmission. It will be clear, however, that while the invention is illustrated in connection with, and finds one desirable application to, the control of such a transmission, it is also applicable to many other kinds of devices.

In the past, as a general proposition, controls for transmissions of the character here under consideration have been so constructed as to require the attendant actively to continue direct attendance upon the shifting mechanism until such time as the transmission attains the desired output speed. It is a primary object of the present invention to provide mechanism of such character that an attendant may set a manually operable element instantaneously, and then abandon the mechanism with the assurance that the transmission will, without further attention, attain and thereafter maintain the output speed identified by the position to which the attendant has so set the control element. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is an elevation, partly in section, of a variable speed transmission of the expansible V-pulley type, with my novel control mechanism associated therewith;

Fig. 2 is an enlarged elevation of the manually operable control assembly forming a part of the invention;

Fig. 3 is an enlarged elevation of the switching mechanism forming a part of the present control, the housing therefor being shown in section; and Fig. 4 is a transverse section through the unit of Fig. 3, taken substantially on the line 4—4 of Fig. 3 and looking in the direction of the arrows.

In the drawing, I have illustrated a well known type of variable speed transmission, indicated generally by the reference numeral 10, and comprising a housing 11 in which is journaled an output shaft 12. The housing is formed with an aperture 13 which is closed by the frame of the motor 14, the spindle 15 of which projects through said aperture 13 into the interior of the housing 11. Fixed to the motor spindle 15 within the housing 11 is one coned disc 16 of an expansible V-pulley indicated generally by the reference numeral 17. The shiftable disc 18 of said pulley is adapted to be moved axially with respect to the disc 16 through the medium of a yoke 19, suitably connected to a thrust bearing associated with the disc 18, and carried by a nut 20 threadedly mounted on a screw shaft 21 journaled in a closure plate 22 which closes an aperture 23 aligned with the aperture 13 in the casing 11. Means 24 carried by the plate 22 holds the nut 20 against rotation, so that rotation of the screw shaft 21 in opposite directions will produce lineal movement of the nut 20 in correspondingly opposite directions.

Outside the housing 11, the screw shaft 21 carries a sprocket 25 suitably connected to be driven from a sprocket 27 carried on the spindle of a pilot motor 26.

The output shaft 12 of the transmission fixedly carries a coned disc 28 of a second expansible pulley indicated generally by the reference numeral 29. The mating disc 30 of the pulley 29 is constantly resiliently urged toward the disc 28 by a spring 31 bearing at one end against said disc 30 and at its opposite end against a suitable abutment 32 fixed with respect to the disc 28. An edge active belt 33 provides a driving connection between the pulleys 17 and 29.

It will be obvious that rotation of the screw shaft 21 in one direction will shift the nut 20, and therefore the disc 18, toward the disc 16 of the pulley 17, thereby squeezing the belt 33 outwardly between the discs 16 and 18 to increase the effective diameter of the pulley 17, and pulling the belt 33 inwardly between the discs 30 and 28, thereby forcing the disc 30 toward the left against the tendency of the spring 31, to decrease the effective diameter of the pulley 29; thereby increasing the output speed of the transmission. Similarly, rotation of the screw shaft 21 in the opposite direction will shift the nut 20 toward the right, thereby pulling the disc 18 away from the disc 16 and permitting the spring 31 to force the disc 30 toward the disc 28, whereby the belt 33 is forced outwardly between the discs 28 and 30 to increase the effective diameter of the pulley 29, and is pulled inwardly between the discs 16 and 18 to decrease the effective diameter of the pulley 17. Thereby, the output speed of the transmission will be reduced.

A switching unit for controlling the pilot motor 26 is indicated generally by the reference numeral 34. It will be understood, of course, that forward and reversing energizing circuits for the motor 26 are provided.

The unit 34 comprises a housing 35 suitably secured to the plate 22 to close an aperture 360 in said plate communicating with the interior of the housing 11. Suitably journaled in said housing 35 is a shaft 36 with which is associated a coiled spring 37 biasing said shaft 36 toward rotation in a clockwise direction as viewed in Fig. 3. Secured to the shaft 36 is an actuator element 38 having a radially projecting arm 39, and formed with a portion 40 providing an arcuate surface concentric with the shaft 36 for a purpose later to appear. Journaled upon the shaft 36 is a disc-like carriage 41, formed with an annular flange 42 likewise providing an arcuate surface concentric with the shaft 36.

The carriage 41 is provided with arcuate guides, which may be in the form of slots 43 and 44, said guides being angularly spaced from each other, and extending peripherally upon a common circle concentric with the shaft 36. A normally open switch 45 (the details of construction of which are unimportant to the present invention) is adjustably secured to a surface of the carriage 41 by means of a screw 46 passing through the slot 43 and carrying a nut or the like whereby said screw and switch may be secured in place upon the carriage 41 in any position of adjustment within the range of the slot 43. Said switch 45 includes an operating arm 47 swingable in a counterclockwise direction, as viewed in Fig. 3, to close the switch; but normally held by a suitable yielding means in the position illustrated, in which position the switch 45 is open. Preferably, the outer end of the arm 47 will carry a roller 48.

A switch 49, similar in all respects to the switch 45, is adjustably secured to the carriage 41 by a screw 50 like the screw 46 passing through the slot 44. Said switch 49 likewise incorporates an operating arm 51, normally held, by yielding means, in the position illustrated in Fig. 3, but swingable in a clockwise direction, as viewed in Fig. 3, to close the switch. Said arm 51 preferably carries a roller 52.

Resilient means is provided for biasing the carriage 41 toward rotation in one direction about the axis of the shaft 36; and, in the illustrated embodiment of the invention, that resilient means comprises a coiled spring 53, one end of which is anchored at 54 upon the housing 35, and the other end of which is anchored at 55 upon the surface 42 of the carriage 41. A flexible wire 56 is wrapped partly around the arcuate surface 42 and has one end anchored on said surface at 57, said wire emerging through a suitable aperture in the housing 35 to extend through a flexible housing 58 to an operating unit indicated generally by the reference numeral 59, which unit may be located at a point remote from the transmission 10.

The unit 59 comprises an oscillable arm 60 pivotally mounted at 61 and including a finger piece 62 and a pointer 63 which swings over a graduated stationary plate 64. The arm 60 may preferably be provided with a plurality of perforations 65 variously spaced from the fulcrum 61, for selectively receiving a fastener element 67 securing to said arm a plate 66 to which is secured the adjacent end of the wire 56. It will be obvious that movement of the finger piece 62 toward the left as viewed in Figs. 1 and 2 will exert a pull upon the wire 56 which will produce clockwise movement of the carriage 41 against the tendency of the spring 53; while movement of the finger piece 62 toward the right will force the wire 56 to move toward the left to permit the spring 53 to shift the carriage 41 in a counterclockwise direction.

A flexible tape 68 is wrapped about the arcuate surface 40 of the element 38 and is secured thereto as at 69. The opposite end of said tape 68 extends through the aperture 360 into the housing 11, where it is anchored at 70 upon a post 71 upstanding from the nut 20. Obviously, therefore, movement of the nut 20 toward the left exerts a pull upon the tape 68 which will swing the actuator element 38 in a counterclockwise direction as viewed in Fig. 3; while movement of said nut 20 toward the right relaxes the tape 68 to permit the spring 37 to swing said actuator unit in a clockwise direction.

As is clearly illustrated in Fig. 3, the actuator unit 38 is so positioned that its arm 39 is located between the switches 45 and 49. At its extremity, the arm is formed to provide two fingers 72 and 73 projecting peripherally oppositely and lying in a common circle concentric with the shaft 36. The extent of each of said fingers is such that, when the switches 45 and 49 are positioned in the manner illustrated in Fig. 3, movement of the finger piece 62 from one extremity of its path of movement to the opposite extremity thereof will cause one or the other of the rollers 48 and 52 to move into contact with the extremity of the adjacent finger and almost to the extremity of the other finger. It is to be noted, in this connection, that, as illustrated in Fig. 4, the arm 39 is axially removed from the path of the rollers 48 and 52, so that it will not interfere therewith.

The switch 45 is connected in that energizing circuit for the motor 26 which will cause the motor 26 to operate in a direction to rotate the sprocket 25 in a counter-clockwise direction, while the switch 49 is connected in that energizing circuit for the motor 26 which will cause the motor 26 to operate the sprocket in a clockwise direction, as viewed from the right of Fig. 1. If, now, the parts being in the positions illustrated in Fig. 3, the finger piece 62 is moved even very slightly to the right, the wire 56 will be shifted to the left to permit the spring 53 to shift the carriage 41 correspondingly in a counterclockwise direction. Thereby the roller 48 is moved into engagement with the finger 72, which engagement will shift the arm 47 in a counterclockwise direction with respect to the switch housing to close the switch 45. Thus the motor 26 is energized to rotate the sprocket 25 and screw shaft 21 in a counterclockwise direction, which will cause lineal movement of the nut 20 toward the left, as viewed in Fig. 1. Such movement of the nut 20 will exert a pull upon the tape 68 to swing the actuator 38 in a counterclockwise direction; and that operation of the motor will continue until the nut 20 has been moved far enough to disestablish the engagement between the finger 72 and the roller 48. The degree of such movement, of course, will depend upon the degree to which the finger piece 62 has preliminarily been moved.

Thus, if the finger piece 62 is moved to the right-hand extremity of its path, the motor 26 will be energized, as soon as the roller 48 comes into contact with the finger 72, to begin to rotate the screw shaft 21. Of course, the finger piece can be moved instantaneously throughout its path, and some time will be required for the motor 26 to shift the nut 20 far enough to disengage the finger 72 from the roller 48. But when that finger has been moved out of engagement with the roller 48, the motor 26 will be deenergized, and the parts will come to rest. Of course, at that time, the nut 20 will be at the left-hand extremity of its path, and the arm 39 will stand in a position approximately 45 degrees removed in a counterclockwise direction from the vertical position illustrated in Fig. 3. The carriage 41 will have been moved to a corresponding position, in which the two switch arms 47 and 51 are equally spaced from the position of the actuator arm 39, with the rollers 48 and 52 just out of contact with the extremities of the fingers 72 and 73.

Now, if desired, the finger piece 62 may be instantaneously swung to the left-hand extremity of its path, and the operator may abandon the mechanism immediately, with the assurance that the transmission control element will be shifted to establish minimum output speed of the mechanism. For, as the movement of the finger piece 62 toward the left-hand extremity of the paths begins, the roller 52 will engage the finger 73 to close the switch 49 to energize the motor 26 to drive the sprocket 25 in a clockwise direction. As the movement of the finger piece 62 is rapidly continued beyond that point of engagement, the roller 52 merely moves along the inner surface of the fingers 73 and 72 toward the left-hand extremity of the finger 72, as the wire 56 rotates the carriage 41 in a clockwise direction against the tendency of the spring 53. As soon as the motor 26 is thus energized, the clockwise rotation of the screw shaft 21 will begin to shift the nut 20 toward the right, thereby relaxing the tape 68 to permit the spring 37 to rotate the shaft 36 slowly in a clockwise direction. The carriage 41 immediately assumes a position corresponding to the new position of the finger piece 62, while the actuator 38 slowly swings toward a position in which the arm 39 thereof will lie equidistantly between the switch arms 47 and 51. As the nut 20 reaches the right-hand end of its path, the right-hand extremity of the finger 73 will move out of engagement with the roller 52 to permit the arm 51 to swing to switch-open position to deenergize the motor 26.

I claim as my invention:

1. In a control mechanism for a reversible electric motor, a forward energizing circuit for said motor, a normally open switch dominating said circuit, a member movable to close said switch, a reversing energizing circuit for said motor, a second normally open switch dominating said reversing circuit, a member movable to close said second switch, a carriage mounted for oscillation about a fixed axis, two angularly spaced, peripherally extending guides provided on said carriage and lying in a common circle concentric with the axis of oscillation of said carriage, means mounting said switches respectively on said guides for relative adjustment peripherally of said carriage, an actuator mounted for coaxial oscillation with respect to said carriage, said actuator being provided with oppositely-projecting, peripherally extending fingers concentric with the common axis of oscillation of said carriage and actuator, means for swinging said carriage in one direction relative to said actuator to engage the movable member of said first-named switch with one of said actuator fingers to move said member to close said switch, and for swinging said carriage relative to said actuator in the opposite direction to engage the movable member of said second switch with the other of said actuator fingers to move said member to close said second switch, and means providing a driving connection between said motor and said actuator whereby closure of said first-named switch energizes said motor to cause movement of said actuator in a direction to disengage the movable member of said first-named switch, while closure of said second switch energizes said motor to cause movement of said actuator in the opposite direction to disengage the movable member of said second switch.

2. In a control mechanism, a shaft mounted for oscillation about its axis, means resiliently biasing said shaft toward oscillation in one direction, a carriage journaled on said shaft, means resiliently biasing said carriage toward oscillation in one direction, two switches mounted on said carriage, an actuator for said switches fixed on said shaft and normally positioned between said switches and out of operative engagement therewith, means operable to shift said carriage against the tendency of its biasing means and to hold said carriage in any desired position of adjustment, and means dominated by said switches and energized by movement of said carriage relative to said actuator to cause movement of said actuator to restore the relation between said carriage and actuator wherein said actuator is positioned between said switches and out of operative engagement therewith.

3. In a control mechanism for a reversible electric motor, a forward energizing circuit for such motor, a normally open switch dominating said circuit, a member movable to close said switch, a reversing energizing circuit for such motor, a second normally open switch dominating said reversing circuit, a member movable to close said second switch, an element mounted for oscillation about an axis, means supporting said switches in peripherally spaced relation on said element, a second element mounted for independent oscillation about said axis and having a portion normally positioned between said switches and out of engagement with the movable members thereof, each of said elements being formed with an arcuate surface concentric with said axis, a flexible element wrapped about the arcuate surface of one of said elements and fixed to said one element, means for longitudinally shifting said flexible element, a second flexible element wrapped about the arcuate surface of the other of said elements and fixed to said other element, means lineally shiftable in opposite directions by operation of said motor in opposite directions, said second flexible element being secured to said last-named means, said oscillable elements and said switches being so related that shifting said first-named flexible element in one direction establishes engagement between said second element and the movable member of that one of said switches dominating the energizing circuit for said motor which causes operation of said motor in a direction to shift said lineally shiftable means in a direction to disestablish such engagement.

4. For use with a variable speed transmission including a control member shiftable in opposite directions to vary oppositely the output speed of said transmission, a reversible electric motor operatively connected to shift said control member, a forward energizing circuit for such motor, a normally open switch dominating said circuit, a member movable to close said switch, a reversing energizing circuit for such motor, a second normally open switch dominating said reversing circuit, a member movable to close said second switch, an element mounted for oscillation about an axis, means supporting said switches in peripherally spaced relation on said element, a second element mounted for independent oscillation about said axis and having a portion normally positioned between said switches and out of engagement with the movable members thereof, each of said elements being formed with an arcuate surface concentric with said axis, a flexible element wrapped about the arcuate surface of one of said elements and fixed to said one element, means for longitudinally shifting said flexible element, a second flexible element wrapped about the arcuate surface of the other of said elements and fixed to said other element, said second flexible element being adapted to be operatively connected to said shiftable control member, said oscillable elements and said switches being so related that shifting said first-named flexible element in one direction establishes engagement between said second element and the movable member of that one of said switches dominating the energizing circuit for said motor which causes operation of said motor in a direction adapted to shift said shiftable control member in a direction to disestablish such engagement.

PAUL B. REEVES.